Oct. 17, 1967  L. H. MILES  3,346,960

CHART SCANNING APPARATUS

Filed Nov. 13, 1964

INVENTOR.
LEON H. MILES

ATTORNEYS.

United States Patent Office 3,346,960
Patented Oct. 17, 1967

3,346,960
CHART SCANNING APPARATUS
Leon H. Miles, Tulsa, Okla., assignor to Sinclair Research, Inc., New York, N.Y., a corporation of Delaware
Filed Nov. 13, 1964, Ser. No. 410,949
10 Claims. (Cl. 33—1)

ABSTRACT OF THE DISCLOSURE

The disclosure relates to a chart scanning apparatus for the analysis and scanning of drill stem test and bottom hole pressure charts. The charts are placed upon a base which has a pair of guide rails and a stop connecting the guide rails, a carriage slidably mounted on the slide rails, and a slide member having cross-hairs mounted in the carriage for use in analyzing and scanning a chart which is positioned on the base.

The present invention relates to a simplified apparatus for use in drill stem test analysis, i.e. analysis of drill stem test and bottom hole pressure charts, and more particularly to apparatus for scanning such charts.

Drill stem tests (DST) and bottom hole pressure charts with which the present invention is primarily concerned include the measurement of pressure transient behavior at bottom-hole conditions, and both use a pressure gauge incorporating a spiral Bourdon tube which is attached to a scribe. The scribe is pressed against an oxidized sheet brass chart, the movement of which is controlled by a clock mechanism. The result is a recording of pressure versus time, i.e. a curve, which can be correlated with certain manipulations performed at the surface which in turn affects the pressure in the reservoir. Interpretation of drill stem test (DST) data by analysis of pressure phenomena has been recognized as an important contribution to petroleum reservoir engineering. The mathematical approach to this analysis was published by D. R. Horner, "Pressure Build-up in Wells," Proceedings Third World Petroleum Congress, Section II, E. J. Brill, Lerden, Holland (1951). The damage concept was introduced by W. Hurst, "Establishment of the Skin Effect and Its Impediment of Fluid Flow Into a Well Bore," Petroleum Engineer, October 1953.

The DST chart or curve itself is of little value, but data points, i.e. pressure and time values, taken from the curves can be used in calculations to determine such important parameters as permeability, reservoir limits, fluid contacts, and formation damage. A difficulty is presented, however, in that the sheet metal DST chart has no grids or other aids to help locate the desired data points. A number of papers concerning the analysis of the curves obtained from DST analysis were published from 1957 to 1961. Since the accuracy required in DST analysis is beyond that which could be expected from a transparent overlay, or a straight-edge rule, these papers were based on the use of accurate, very delicate instruments for scanning the DST curves to obtain very accurate pressure and time determinations which instruments were suited primarily for office use. DST chart scanning instruments available commercially, for example, traverse the chart by a screw drive or gear chain coupled to a counter. Sensitivity of these instruments is normally 0.001 inch.

It is an object of the present invention to provide a chart scanner which because of its simplicity and rugged construction is suitable for obtaining accurate pressure and time determinations from DST curves in the field. It is a further object of the present invention to provide a chart scanner which is inexpensive to construct, simple to operate and designed to withstand physical abuse. A chart scanner which may be used in the field at the well-site, as contrasted with the present delicate instruments for office use, has many advantages among which are that it helps field personnel make decisions which are necessary immediately after the drill stem test, i.e. drill ahead, standby, re-test, coring, logging, etc. and that it provides a method for converting the curves obtained from the drill stem test to a series of data points which give field personnel a language they can use to describe reservoir performance by telephone in daily reports.

In general, the chart scanner of the present invention is designed to quickly locate the desired data points on the DST curve and provide means for translating these points into meaningful terms. In order to locate the data points, the scanner is provided with a major sliding means comprising first and second carriage means each movable in and supported by a stationary guide means or guideway. The major sliding means carries a guide means supporting a minor sliding means formed by a third carriage means. The major sliding means provides for measurement of the vertical (pressure) component of the curve and the minor sliding means provides for measurement of the horizontal (time) component of the curve. By arrangement of the major and minor sliding means over known points, base line readings for zero pressure and zero time can be established. Pressure in p.s.i. per unit length is furnished from dead weight calibration of the gauge. Time in seconds per unit length can be calibrated from the total time of the test divided by the total horizontal traverse of the chart.

The present invention will be more fully understood from the following detailed description with reference to the accompanying drawings in which the preferred embodiment has been shown and in which.

Figure 1:
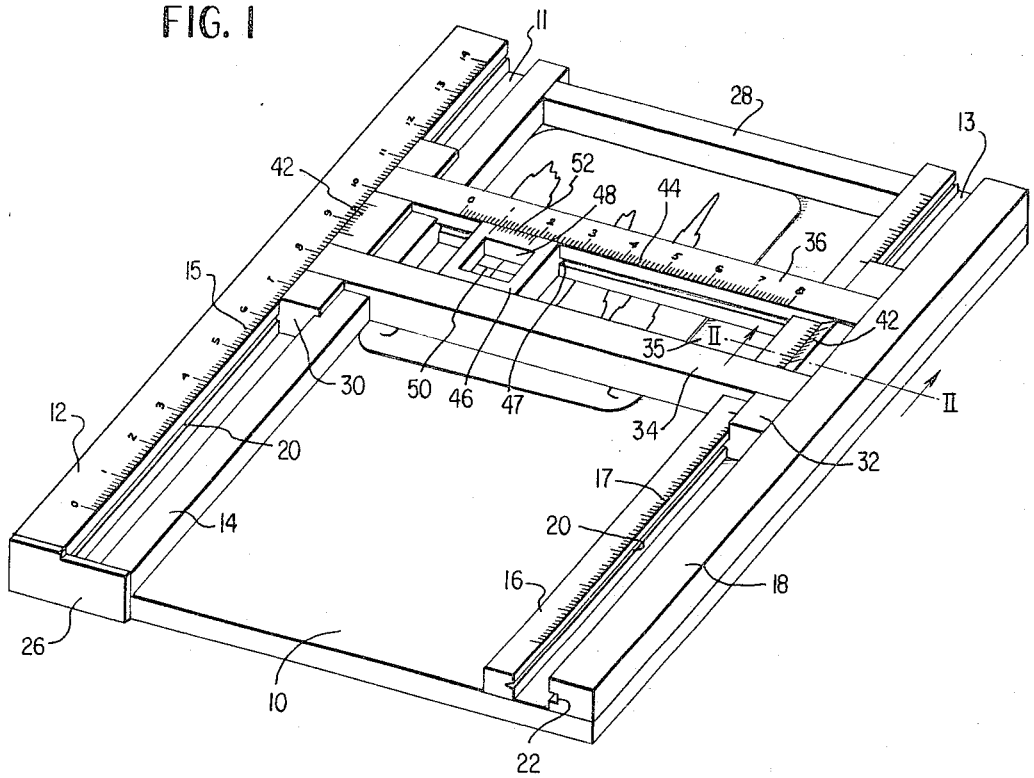
FIGURE 1 is a perspective view of the chart scanner.

Referring now to FIGURE 1, the chart scanner comprises a heavy base 10, preferably made of a metal such as aluminum and parallel guide rails 12, 14, 16 and 18 mounted in pairs adjacent opposite edges of base 10. Guide rails 12 and 14 are mounted at the left side of base 10 and from therebetween a first guideway 11, and guide rails 16 and 18 are mounted at the right side of base 10 and from therebetween a second guideway 13. The left hand guide rails 12 and 16, respectively, on each side of the base 10 are provided with scales 15 and 17, respectively, calibrated in centimeters with millimeter subdivisions. Each left hand guide rail 12 and 16 is also provided with a slot 20, e.g. V-shaped or square and the right hand guide rails 14 and 18, respectively, on each side are provided with slots 22 (only one of which is shown). A pair of stops 26 (only one of which is shown) are secured over the ends of each pair of guide rails at the lower end of the base 10 and serve to retain the major sliding means described below. A stop 28 is arranged at the upper end of base 10 in FIGURE 1 between the inner rails of each pair, i.e. rails 14 and 16, for a similar purpose.

Figure 2:
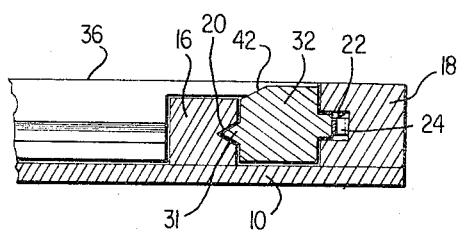
FIGURE 2 is a partial cross-sectional view of the scanner taken along section line II—II in FIGURE 1.

The major sliding means which measures the vertical component, i.e. pressure, on the DST curve is arranged in the guideways 11 and 13 to be guided by the slots 20 and slot 22 in each pair of adjacent guide rails. The major sliding means consists of two carriages or vertical bars 30 and 32 which fit, respectively, into guideways 11 and 13 between the guide rails of each pair, 12 and 14, 16 and 18, mounted on the base 10. Springs 24 arranged in each slot 22 in guide rails 14 and 18 hold the vertical bars 30 and 32, respectively, against guide rails 12 and 16 and press the nose portions 31 (see FIGURE 2) provided on vertical bars 30 and 32 into the guide slots 20 in guide rails 12 and 16, respectively, for accurate control of the vertical bars 30 and 32. The nose portions 31 of vertical bars 30 and 32 may be pointed as shown, particularly if slot 20 is V-shaped as shown, or of any other shape desired. Each vertical bar 30 and 32 is marked with a vernier scale 42, 0.9 centimeter divided into 0.09 centimeter subdivisions, adjacent, respectively, scales 15 and 17 on guide rails 12 and 16. Two horizontal bars or cross rails 34 and 36 are connected at each end, respectively, to the vertical bars 30 and 32 and form a third guide way 35 therebetween. Horizontal bars 34 and 36 serve as guides for the minor sliding means described below and contain, respectively, a slot 38, e.g. V-shaped or square, in the upper horizontal bar 36 and the slot (not shown) in the lower horizontal bar 34. The upper horizontal bar 36 contains a scale 44 divided into millimeters. The minor sliding means which measures the horizontal, i.e. time, component of the DST curve comprises a member or carriage 46 of such a size and shape that it fits snugly in guideway 35 between the two horizontal guide bars 34 and 36 of the major sliding means. Member 46 has a nose portion 47 which is held snugly against the upper horizontal bar 36, i.e. in slot 38 by a spring (not shown) located in the slot in the lower horizontal bar 34. Slide member 46 has an opening 48 extending therethrough and a plastic window 50 containing cross-hairs forming a pointer is attached in the bottom of this opening and is located with a minimum of clearance between the cross-hair and the metal chart which is to be read. A vernier scale 52, 0.9 centimeter divided into 0.09 centimeter subdivisions, is provided on member 46 for accurate reading of the horizontal component of the chart.

In operation, the chart scanner of the present invention is used as follows: The lower right hand corner of a metal chart obtained from the DST equipment is attached to the base 10 for example, with a square of cellulose tape after the upper left hand corner of the chart has been positioned in the upper left hand corner of the base against guide rail 14 and stop member 28. Thereafter, by locating the cross-hairs in plastic shield 50 over known points of the chart, base line readings are established in centimeters for relative zero pressure and zero time. The desired points for pressure and time are then determined, for example, and all pressure distances are converted to actual pressures from the calibration charts available for the DST equipment which produced the chart. Time distances are converted to actual time from stop-watch measurements made during a recording. Those skilled in the art are then provided with the proper data to perform the calculations typical of DST analysis.

The sensitivity of the chart scanner is approximately 0.004 inch. Deviations in calculated results using the scanner of the present invention are well within the accuracy needed. The observed readings fall within the accuracy range of the typical pressure gauge used in DST tests. Error from thermal expansion of the instrument under extreme weather conditions is within the limits of reading accuracy. A temperature deviation of ±450° F. from room temperature results in and expansion of .004 inch over the readable portion of the instrument, moreover, the metal chart itself has nearly the same coefficient of expansion as the scanner and compensates for this slight error.

It is claimed:

1. A chart scanning apparatus, especially for drill stem test charts, comprising a broad base means; first guideway means secured on the base means disposed along one edge thereof and comprising a first pair of parallel, spaced apart guide rails defining therebetween a first guideway; second guideway means secured on the base means disposed along the edge thereof opposite said one edge and comprising a second pair of parallel, spaced apart guide rails defining therebetween a second guideway; major sliding means comprising a first carriage means movable along the first guideway, a second carriage means movable along the second guideway, and a pair of parallel, first resilient means for applying a force against at least one of said first and second carriage means to cause the one carriage means to normally bear against one of the guide rails spaced apart cross rails secured at the opposite ends thereof to the first and second carriage means and adapted to move therewith along the first and second guideways, said pair of cross rails defining therebetween a third guideway; minor sliding means comprising a third carriage means carrying pointer means movable along said third guideway and second resilient means for applying a force against the third carriage means to cause the third carriage means to normally bear against one of the cross rails; elongated fixed first scales on one rail of each of said pairs of guide rails and on one of said cross rails and extending along, respectively, said first, second and third guideways; vernier scales mounted on each of said first, second and third carriage means close to and parallel to a respective said first scale for accurately reading said first scales; and abutment means adjacent the opposite ends of said first and second guideway means for retaining said first and second carriage means in said first and second guideways and for locating a chart to be worked upon, said vernier scales on said first and second carriage means being movable together longitudinally along said guide rails and said vernier scale on said third carriage means being movable independently of said vernier scales on first and second carriage means along said cross rails whereby said pointer means may be accurately positioned on said chart.

2. Apparatus of claim 1 wherein said first scales are graduated in millimeters.

3. Apparatus of claim 1 wherein said abutment means comprises plates extending across the ends of said first and second guideways.

4. Apparatus of claim 1 wherein said abutment means includes a bar secured to said base means between said first and said second guideway means.

5. The apparatus of claim 1 wherein said first resilient means is a spring means arranged between the one carriage means and one guide rail of a respective one of the pairs of guide rails which causes the one carriage means to bear against the other guide rail of the respective pair, and said second resilient means is a second spring means arranged between the third carriage means and one of the cross rails of said pair of cross rails which normally causes the third carriage means to bear against the other of the pair of said cross rails.

6. The apparatus of claim 5 wherein there is a first resilient means including a spring means arranged at each of the first and second carriage means.

7. The apparatus of claim 5 wherein said one guide rail of the respective pair of guide rails has a groove therein and the one carriage means has a nose portion extending into a second groove in the other guide rail of the respective pair of guide rails, said groove, second groove and nose portion forming a part of the first resilient means and the spring means being arranged in the groove in the said one guide rail and normally pressing the nose of said carriage means into the second groove in the said other guide rail.

8. The apparatus of claim 7 wherein the said one cross rail of the pair of cross rails has a groove therein and the third carriage means has a nose portion extending into another groove in the other cross rail of the pair of cross rails, said groove in the one cross rail, another groove and nose portion on the third carriage means forming a part of the second resilient means and said second spring means being arranged in the groove in said one cross rail and normally pressing the nose of said carriage means into another groove in the other cross rail.

9. The apparatus of claim 8 wherein there is a first resilient means including a first spring means arranged at each of the first and second carriage means.

10. A chart scanning apparatus, especially for drill stem test charts, comprising a broad base means; first guideway means secured on the base means disposed along one edge thereof; second guideway means secured on the base means disposed along the edge thereof opposite said one edge; major sliding means comprising a first carriage means movable along the first guideway, a second carriage means movable along the second guideway, and a pair of parallel, first resilient means for biasing said major sliding means so that at least one of the carriage means will bear against a guideway means during movement of the major sliding means, and spaced apart cross rails secured at the opposite ends thereof to the first and second carriage means and adapted to move therewith along the first and second guideways, said pair of cross rails defining therebetween a third guideway; minor sliding means comprising a third carriage means carrying pointer means movable along said third guideway and a second resilient means for biasing said minor sliding means so that said third carriage means will bear against a cross rail of the third guideway means during movement of the minor sliding means; elongated fixed first scales adjacent at least one of the first and second guideway means and on one of said cross rails and extending along, respectively, said one of the first and second guideway means and the third guideway; vernier scales mounted on the one of said first and second carriage means adjacent the said one of the first and second of guideway means and the third carriage means close to and parallel to a respective said first scale for accurately reading said first scales; and abutment means adjacent the opposite ends of said first and second guideway means for retaining said first and second carriage means in said first and second guideways, said vernier scale on said one of the first and second carriage means being movable longitudinally along said guideway means and said vernier scale on said third carriage means being movable independently of said vernier scale on the one of first and second carriage means along said cross rails whereby said pointer means may be accurately positioned on said chart.

References Cited

UNITED STATES PATENTS

| | | | |
|---|---|---|---|
| 1,142,077 | 6/1915 | Buchanan | 33—80 |
| 1,767,026 | 6/1930 | Waterbury | 33—80 |
| 2,109,065 | 2/1938 | Haselton | 33—80 |
| 2,469,129 | 5/1949 | Reimann | 33 |
| 2,501,550 | 3/1950 | Tamagna et al. | 33 |
| 2,583,578 | 1/1952 | Lowndes | 33—189 |
| 2,934,829 | 5/1960 | Bohn | 33—189 |
| 3,024,696 | 3/1962 | Bomzer | 33—189 |

LEONARD FORMAN, *Primary Examiner.*

WILLIAM D. MARTIN, *Examiner.*